United States Patent
Jung et al.

(10) Patent No.: US 6,504,045 B2
(45) Date of Patent: Jan. 7, 2003

(54) CRYSTAL POLYMORPHS OF A YELLOW DISAZO COLORANT, AND THEIR PREPARATION

(75) Inventors: Ruediger Jung, Kelkheim; Hans-Joachim Metz, Darmstadt; Joachim Weber, Frankfurt am Main; Martin U. Schmidt, Frankfurt am Main; Olaf Schupp, Frankfurt am Main; Andreas Wacker, Lampertheim, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/952,499

(22) Filed: Sep. 13, 2001

(65) Prior Publication Data

US 2002/0065402 A1 May 30, 2002

(30) Foreign Application Priority Data

Sep. 15, 2000 (DE) .......................... 100 45 790

(51) Int. Cl.[7] .......................... C07C 229/00
(52) U.S. Cl. .................. 560/34; 534/550; 534/558; 534/561; 534/564; 534/579; 534/748; 534/575; 524/190; 562/19; 562/47
(58) Field of Search ............... 534/550, 55 B, 534/561, 564, 575, 579, 748; 524/190; 562/47, 19; 560/34

(56) References Cited

U.S. PATENT DOCUMENTS

| | | | |
|---|---|---|---|
| 3,997,521 A | 12/1976 | Forter et al. | |
| 4,338,092 A | 7/1982 | Schneider | |
| 4,518,391 A | 5/1985 | Auerbach | |
| 4,685,934 A | 8/1987 | Benguerol et al. | |
| 4,866,163 A | 9/1989 | Koch | |
| 4,875,903 A | 10/1989 | Pedrazzi | |
| 4,968,352 A | 11/1990 | Keys et al. | |
| 5,030,247 A | 7/1991 | Goldmann | |
| 5,283,325 A | 2/1994 | Bitterli | |
| 5,560,760 A | 10/1996 | Toeppen | |
| 5,616,778 A | 4/1997 | Goldmann et al. | |
| 5,716,446 A | 2/1998 | Alfter et al. | |
| 6,117,606 A | 9/2000 | Macholdt et al. | |
| 6,207,809 B1 | 3/2001 | Nestler | |

FOREIGN PATENT DOCUMENTS

| | | | |
|---|---|---|---|
| CH | 681 154 | | 1/1993 |
| CS | 266632 | * | 4/1989 |
| DE | 2058849 | * | 4/1970 |
| DE | 35 01 199 | | 8/1985 |
| GB | 1076635 | | 7/1967 |
| GB | 1 328 861 | | 9/1973 |
| GB | 2 356 866 | | 6/2001 |

OTHER PUBLICATIONS

EPO Search Report for Application No. 01121135, mail date Nov. 9, 2001.

* cited by examiner

Primary Examiner—Paul J. Killos
Assistant Examiner—Hector M Reyes
(74) Attorney, Agent, or Firm—Anthony A. Bisulca

(57) ABSTRACT

The invention relates to six new crystal polymorphs, α (alpha), β (beta), γ (gamma), δ (delta), ζ (zeta), and η (eta), of the disazo colorant of the formula I,

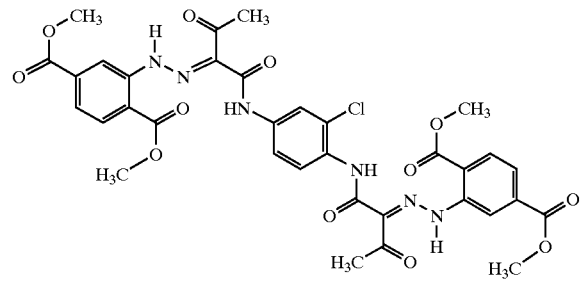

(I)

having characteristic reflections in the X-ray diffraction spectrum. The novel crystal polymorphs are prepared by treatment in organic solvents.

18 Claims, No Drawings

CRYSTAL POLYMORPHS OF A YELLOW DISAZO COLORANT, AND THEIR PREPARATION

BACKGROUND OF THE INVENTION

The present invention relates to novel crystal polymorphs (alpha, beta, gamma, delta, zeta and eta) of a yellow disazo colorant having the chemical structure (I), to their preparation and use as pigment.

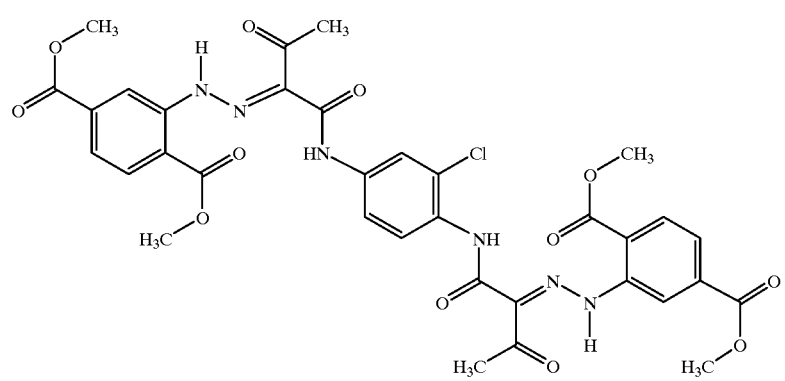

(I)

The majority of organic pigments exist in a plurality of different crystal forms, also called polymorphs. Crystal polymorphs have the same chemical composition but a different arrangement of the building blocks (molecules) in the crystal. The crystal structure determines the chemical and physical properties; consequently, the individual polymorphs frequently differ in rheology, color and other coloristic properties. The different crystal polymorphs may be identified by means of X-ray powder diffractometry.

The compound of the formula (I) is formed by coupling one equivalent of 2-chloro-N,N'-1,4-diacetoacetylphenylenediamine (II) with two equivalents of diazotized dimethyl aminoterephthalate (III), and is described in DE-A-2 058 849.

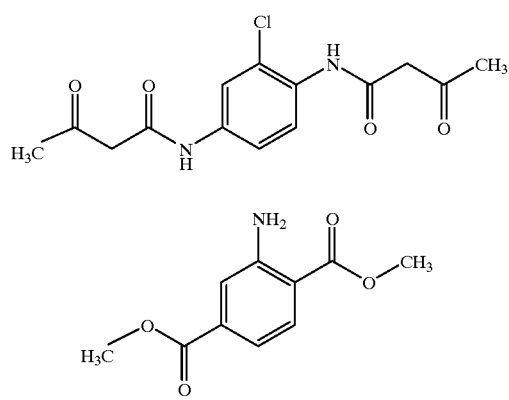

(II)

(III)

CS-A-266 632 describes the treatment of amorphous N,N'-1,4-diacetoacetylphenylenediamine azo pigments in $C_{1-3}$ alcohols or in water at increased pressures of up to 6 bar and 100–150° C. The compound of the formula (I) is not mentioned in the examples there.

The process described in DE-A-2 058 849 gives the compound of the formula (I) as amorphous product to which no crystal phase can be assigned by X-ray powder diffractometry. Amorphous crude pigment obtained in accordance with DE-A-2 058 849 possesses a cloudy reddish yellow hue, inadequate color strength, poor rheological properties, and inadequate solvent resistance, light stability and weathering stability, and in this form is of no interest from an applications standpoint.

If the pigment of the formula (I) is subjected to a solvent treatment by the process described in CS-A-266 632, the resulting product is still substantially amorphous; no crystal polymorph can be assigned to it, and it differs markedly from the phases of the invention described below. The hue and properties of the pigment thus treated also remain virtually unchanged, and render the product of no interest from an applications standpoint.

SUMMARY OF THE INVENTION

It is an object of the present invention to convert the compound of the formula (I) into a form which is useful from an applications standpoint.

It has surprisingly been found that, by treatment in certain organic solvents, it is possible to produce a total of six defined, pure crystal phases of (I). The polymorphs are called α (alpha), β (beta), γ (gamma), δ (delta), ζ (zeta), and η (eta). They feature the following characteristic lines in the X-ray powder diagram (Cu—$K_\alpha$ radiation, double the Bragg angle 2Θ in degrees, interplanar spacings d in $\text{Å}^{-1}$):

| α: 2Θ | d | relative intensity |
| --- | --- | --- |
| 6.1 | 14.6 | 100 |
| 8.2 | 10.8 | 34 |
| 9.0 | 9.9 | 13 |
| 14.1 | 6.3 | 15 |
| 15.2 | 5.8 | 6 |
| 15.8 | 5.6 | 12 |
| 17.0 | 5.2 | 6 |
| 22.1 | 4.0 | 8 |
| 23.6 | 3.8 | 8 |
| 24.0 | 3.7 | 15 |
| 24.8 | 3.6 | 8 |
| 25.3 | 3.5 | 52 |
| 26.1 | 3.4 | 29 |
| 27.3 | 3.3 | 40 |
| 28.8 | 3.1 | 17 |

-continued

| β: 2Θ | d | relative intensity |
|---|---|---|
| 9.0 | 21.6 | 44 |
| 10.6 | 8.3 | 7 |
| 15.1 | 5.8 | 8 |
| 16.0 | 5.5 | 6 |
| 16.5 | 5.4 | 9 |
| 19.5 | 4.5 | 8 |
| 22.1 | 4.0 | 11 |
| 26.9 | 3.3 | 100 |
| 27.7 | 3.2 | 17 |

| γ: 2Θ | d | relative intensity |
|---|---|---|
| 5.9 | 14.9 | 98 |
| 8.0 | 11.1 | 25 |
| 8.7 | 10.1 | 9 |
| 9.6 | 9.2 | 9 |
| 11.8 | 7.5 | 11 |
| 13.8 | 6.4 | 14 |
| 14.9 | 5.9 | 7 |
| 15.5 | 5.7 | 13 |
| 16.6 | 5.3 | 11 |
| 17.6 | 5.0 | 8 |
| 18.3 | 4.9 | 7 |
| 22.8 | 3.9 | 9 |
| 24.1 | 3.7 | 17 |
| 24.4 | 3.6 | 24 |
| 25.5 | 3.5 | 100 |
| 26.1 | 3.4 | 17 |
| 26.4 | 3.4 | 30 |
| 27.2 | 3.3 | 32 |
| 27.4 | 3.2 | 47 |
| 29.0 | 3.1 | 20 |

| δ: 2Θ | d | relative intensity |
|---|---|---|
| 5.8 | 15.2 | 63 |
| 7.9 | 11.2 | 12 |
| 9.4 | 9.4 | 6 |
| 11.6 | 7.6 | 16 |
| 13.4 | 6.6 | 6 |
| 15.1 | 5.9 | 9 |
| 16.4 | 5.4 | 9 |
| 17.2 | 5.2 | 8 |
| 18.0 | 4.9 | 8 |
| 23.2 | 3.8 | 5 |
| 23.4 | 3.8 | 5 |
| 23.7 | 3.8 | 7 |
| 24.3 | 3.7 | 17 |
| 24.6 | 3.6 | 13 |
| 25.5 | 3.5 | 100 |
| 25.8 | 3.4 | 21 |
| 26.4 | 3.4 | 22 |
| 26.9 | 3.3 | 22 |
| 27.3 | 3.3 | 41 |
| 28.6 | 3.1 | 7 |
| 28.8 | 3.1 | 11 |

| ζ: 2Θ | d | relative intensity |
|---|---|---|
| 7.0 | 12.6 | 7 |
| 8.9 | 9.9 | 23 |
| 11.2 | 7.9 | 10 |
| 11.9 | 7.4 | 48 |
| 13.2 | 6.7 | 6 |
| 14.0 | 6.3 | 7 |
| 15.1 | 5.9 | 26 |
| 17.2 | 5.1 | 37 |
| 18.0 | 4.9 | 14 |
| 18.2 | 4.9 | 27 |
| 21.5 | 4.1 | 33 |
| 21.8 | 4.1 | 27 |
| 22.6 | 3.9 | 13 |

-continued

| | | |
|---|---|---|
| 23.9 | 3.7 | 100 |
| 24.7 | 3.6 | 13 |
| 25.2 | 3.5 | 17 |
| 25.9 | 3.4 | 7 |
| 26.9 | 3.3 | 76 |
| 27.1 | 3.3 | 92 |
| 27.8 | 3.2 | 7 |
| 29.9 | 3.0 | 6 |
| 31.1 | 2.9 | 7 |
| 31.7 | 2.8 | 9 |
| 32.3 | 2.8 | 7 |
| 33.0 | 2.7 | 8 |

| η: 2Θ | d | relative intensity |
|---|---|---|
| 9.0 | 9.9 | 60 |
| 11.5 | 7.7 | 6 |
| 14.1 | 6.3 | 6 |
| 16.0 | 5.5 | 23 |
| 20.1 | 4.4 | 7 |
| 21.5 | 4.1 | 16 |
| 26.8 | 3.3 | 100 |
| 27.5 | 3.2 | 7 |
| 27.9 | 3.2 | 12 |

All of the line positions are given to an accuracy of ±0.2°.

In the solid state, the compound of the formula (I) may also exist in a different tautomeric and/or cis/trans-isomeric form.

All of the polymorphs differ in their X-ray diffraction diagrams and in terms of their properties from the products obtained in accordance with the known processes of DE-A-2 058 849 and CS-A-266 632. The novel polymorphs are of low solubility, are strongly colored and are notable for good fastness properties and brilliant yellow colorations.

DESCRIPTION OF THE PREFERRED EMBODIMENTS

The present invention provides a process for preparing crystal polymorphs of a disazo colorant of the formula (I), which comprises causing one or more solvents from the group consisting of dimethylformamide, N-methylpyrrolidone, dimethyl sulfoxide, $C_4$–$C_{20}$ alcohol, 1,2-dichlorobenzene, pyridine, and nitrobenzene, or combinations of these solvents with water, the water content being from 0 to 90% by weight, to act on a compound of the formula (I) or on a tautomer, cis/trans isomer or a tautomeric cis/trans isomer of the compound of the formula (I) at a temperature of at least 100° C.; this procedure is referred to below as "solvent treatment".

To obtain a novel crystalline phase of the compound of the formula (I), it is possible to use amorphous crude pigment, another of said crystal polymorphs, or a mixture of two or more crystal polymorphs. The compound of the formula (I) may be present in the form, for example, of dry pigment, presscakes, or an aqueous suspension.

The solvent treatment takes place preferably at from 135 to 250° C., with particular preference at from 150 to 200° C. The duration of the solvent treatment is appropriately from 1 minute to 24 hours, preferably from 5 minutes to 10 hours, in particular from 10 minutes to 5 hours. It is appropriate to cool the pigment to room temperature before isolating it.

The yellow alpha (α) polymorph is obtained, for example, by dissolving pigment of the formula (I) as the beta (β) polymorph in pyridine at from 110 to 130° C. and reprecipitating it by cooling.

The beta (β) polymorph is formed, for example, by heating crude pigment of the formula (I) to from 135 to 160°

C. in dimethylformamide (DMF), N-methylpyrrolidone (NMP), or a mixture of DMF or NMP with water. The crystalline, greenish yellow pigment obtained possesses a brilliant hue, high opacity and color strength, very good solvent resistance, and excellent light and weather fastness.

The yellow gamma (γ) polymorph is obtained, for example, by dissolving a pigment of the formula (I) as the beta (β) polymorph in o-dichlorobenzene at from 170 to 190° C. and reprecipitating it by cooling.

The yellow delta (δ) polymorph is obtained, for example, by dissolving pigment of the formula (I) in the beta phase in dimethyl sulfoxide at from 180 to 200° C. and causing it to crystallize slowly by cooling. The delta polymorph is also formed if nitrobenzene at from 140 to 210° C. is used as solvent instead of dimethyl sulfoxide.

The zeta (ζ) polymorph is obtained, for example, by dissolving pigment of the formula (I) in the form of the beta phase in dimethylformamide at from 135 to 160° C., cooling the solution to below 50° C., and overlaying it with methanol. Yellow pigment crystallizes as the zeta (ζ) polymorph.

The eta (η) polymorph is obtained, for example, by heating amorphous crude pigment of the formula (I) to from 170 to 190° C. in o-dichlorobenzene, without dissolving it completely, and then cooling it again. The pigment possesses a brilliant greenish yellow hue, high opacity and color strength, and very good solvent, light and weather fastness.

Depending on the purity of the starting materials, the concentrations, the applied temperatures and temperature programs, any aftertreatment, the pressure, the presence of impurities or additives, and the presence of seed crystals, the crystal polymorphs may be obtained in pure form or as a mixture of the different polymorphs.

A pure or predominantly pure polymorph is formed preferably by starting from a solution already containing seed crystals of the desired polymorph, and cooling the solution with sufficient slowness, or adding a second solvent at a sufficiently slow rate, that the supersaturation is held within a range in which the rate of crystal growth is relatively high while the rate of crystal seed formation is relatively low, so that the existing crystal seeds grow while retaining the polymorph. The use of a mechanical stirrer may be of advantage, since it breaks down existing crystals of the desired polymorph into a large number of smaller fragments, which may then serve in turn as crystal seeds for the desired polymorph (in a process known as secondary nucleation).

If a supersaturation is higher, for example, because the solution is cooled more rapidly or a second solvent is added more rapidly, the rate of crystal seed formation is much higher, with the result that many crystal seeds of different polymorphs may form spontaneously; in this case, mixtures of different polymorphs are obtained preferentially.

The invention additionally provides a mixture of the disazo colorant of the formula (I) comprising at least 10%, preferably at least 25%, in particular at least 50%, with particular preference at least 75%, with very particular preference at least 90%, of the alpha polymorph, of the beta polymorph, of the gamma polymorph, of the delta polymorph, of the zeta polymorph, of the eta polymorph or of a mixture of two, three, four, five or six of these polymorphs.

To facilitate the preparation of the desired polymorph, to stabilize the desired polymorph, to enhance the coloristic properties, and to achieve particular coloristic effects it is possible to add pigment dispersants, surface-active agents, defoamers, extenders or other additives at any desired points of the process. It is also possible to use mixtures of these additives. The additives may be added all at once or in two or more portions. The additives may be added at any point in the synthesis or in the various aftertreatments (heating with a solvent, recrystallization, grinding, kneading), or following the aftertreatments. The point in time that is best suited must be determined beforehand by means of rangefinding tests.

Depending on the desired field of application it may be sensible to subject the resulting pigment to mechanical fine division. The fine division may be carried out by wet or dry grinding.

Pigments of the formula (I) as the inventive alpha, beta, gamme, delta, zeta or eta polymorphs are suitable for pigmenting coating materials and plastics, for producing printing inks and aqueous or solventborne pigment preparations, and for coloring seed.

Pigments of the formula (I) as the beta or eta polymorph possess high color strength and unusually good light stability and weathering stability, and are notable for brilliant greenish yellow colorations. They are therefore especially suitable for coloring coating materials.

The inventive polymorphs of the pigment of the formula (I) are suitable as colorants in electrophotographic toners and developers, such as one- or two-component powder toners (also called one- or two-component developers), for example, magnetic toners, liquid toners, latex toners, addition polymerization toners, and specialty toners.

Typical toner binders are addition polymerization, polyaddition and polycondensation resins, such as styrene, styrene acrylate, styrene butadiene, acrylate, polyester, and phenol-epoxy resins, polysulfones, polyurethanes, individually or in combination, and also polyethylene and polypropylene, which may contain further ingredients, such as charge control agents, waxes or flow aids, or may be subsequently modified with these additives.

The inventive polymorphs are of further suitability as colorants in powders and powder coating materials, especially in triboelectrically or electrokinetically sprayable powder coating materials that are used to coat the surfaces of articles comprising, for example, metal, wood, plastic, glass, ceramic, concrete, textile material, paper or rubber.

Powder coating resins employed typically comprise epoxy resins, carboxyl- and hydroxyl-containing polyester resins, polyurethane resins and acrylic resins together with customary curing agents. Resin combinations are also employed. For example, epoxy resins are frequently used in combination with carboxyl- and hydroxyl-containing polyester resins. Examples of typical curing components (depending on the resin system) are acid anhydrides, imidazoles, and also dicyandiamide and its derivatives, blocked isocyanates, bisacylurethanes, phenolic and melamine resins, triglycidyl isocyanurates, oxazolines, and dicarboxylic acids.

Furthermore, the inventive polymorphs are useful as colorants in inks, preferably ink-jet inks, such as those on an aqueous or nonaqueous basis, for example, in microemulsion inks, and in those inks which operate in accordance with the hot-melt process.

Ink-jet inks generally contain a total of from 0.5 to 15% by weight, preferably from 1.5 to 8% by weight, (calculated on a dry basis), of one or more of the inventive polymorphs.

Microemulsion inks are based on organic solvents, water and, if desired, an additional hydrotropic substance (interface mediator). Microemulsion inks contain from 0.5 to 15% by weight, preferably from 1.5 to 8% by weight, of one or more of the inventive polymorphs, from 5 to 99% by weight of water, and from 0.5 to 94.5% by weight of organic solvent and/or hydrotropic compound.

"Solvent based" ink-jet inks contain preferably from 0.5 to 15% by weight of one or more inventive polymorphs, and from 85 to 99.5% by weight of organic solvent and/or hydrotropic compounds.

Hot-melt inks are based generally on waxes, fatty acids, fatty alcohols or sulfonamides which are solid at room temperature and liquefy on heating, the preferred melting range being between about 60° C. and about 140° C. Hot-melt ink-jet inks consist substantially, for example, of from 20 to 90% by weight of wax and from 1 to 10% by weight of one or more of the inventive polymorphs. It is also possible for from 0 to 20% by weight of an additional polymer (as "dye dissolver"), from 0 to 5% by weight of dispersing aids, from 0 to 20% by weight of viscosity modifiers, from 0 to 20% by weight of plasticizers, from 0 to 10% by weight of tack additive, from 0 to 10% by weight of transparency stabilizer (which prevents, for example, crystallization of the waxes), and from 0 to 2% by weight of antioxidant to be present. Typical additives and auxiliaries are described, for example, in U.S. Pat. No. 5,560,760.

In addition, the inventive polymorphs are also useful as colorants for color filters, both for additive and for subtractive color generation, and for coloring seed.

In the examples below parts and percentages are by weight. The crystal polymorph of the products obtained is determined by means of X-ray powder diffractometry.

EXAMPLES

Comparative Example 1

Synthesis of Crude Pigment

Dimethyl aminoterephthalate is diazotized by the process of DE-A-2 058 849, example 54 and coupled with 2-chloro-1,4-N,N'-diacetoacetylphenylenediamine. This gives a reddish yellow amorphous crude pigment of chemical structure (I), to which no crystal polymorph can be assigned.

Comparative Example 2

Finish According to CS-A-266 632

Amorphous crude pigment of the formula (I) from comparative example 1 is suspended in ethanol and the suspension is heated to 130° C. in an autoclave and stirred for 8 hours. After cooling, the product is filtered off and washed. This gives a substantially amorphous reddish yellow pigment of chemical structure (I), to which no crystal polymorph can be assigned.

Example 1

Preparation of the Beta Polymorph

Amorphous pigment of the formula (I) in the form of an aqueous presscake is suspended in dimethylformamide, water is distilled off until the temperature of the liquid phase is 140° C., and the suspension is stirred for 30 minutes. After cooling, it is filtered and the solid product is washed. This gives a crystalline, greenish yellow pigment of chemical structure (I) as the beta polymorph.

Example 2

Preparation of the Beta Polymorph

Amorphous pigment of the formula (I) is suspended in N-methylpyrrolidone, the suspension is stirred at 150° C. for 3 hours, cooled and filtered, and the solid product is washed. This gives a crystalline, greenish yellow pigment of chemical structure (I) as the beta polymorph.

Example 3

Preparation of the Alpha Polymorph

A pigment of the formula (I) as the beta polymorph is dissolved in boiling pyridine at 120° C. and slowly reprecipitated by cooling the solution. Filtration and washing give a crystalline yellow pigment of chemical structure (I) as the alpha polymorph.

Example 4

Preparation of the Gamma Polymorph

Pigment of the formula (I) as the beta polymorph is dissolved in boiling
o-dichlorobenzene at 180° C. and slowly reprecipitated by cooling the solution. Filtration and washing give a crystalline yellow pigment of chemical structure (I) as the gamma polymorph.

Example 5

Preparation of the Delta Polymorph

Pigment of the formula (I) as the beta polymorph is dissolved in dimethyl sulfoxide at 190° C. On cooling, a solid crystallizes which is filtered off and dried. This gives a crystalline yellow pigment of chemical structure (I) as the delta polymorph.

Example 6

Preparation of the Delta Polymorph

Pigment of the formula (I) as the beta polymorph is dissolved in nitrobenzene at 155° C. and reprecipitated by slow cooling. Filtration and washing give a crystalline yellow pigment of chemical structure (I) as the delta polymorph.

Example 7

Preparation of the Zeta Polymorph

Pigment of the formula (I) as the beta polymorph is dissolved in boiling dimethylformamide at 155° C. and, after cooling, is overlaid with five times the amount of methanol. A yellow solid crystallizes, and is isolated. This gives a crystalline yellow pigment of chemical structure (I) as the zeta polymorph.

Example 8

Preparation of the Eta Polymorph

Amorphous pigment of the formula (I) is suspended in 1,2-dichlorobenzene and the suspension is stirred at 170° C. for 3 hours. It is subsequently cooled and filtered, and the solid product is washed. This gives a crystalline yellow pigment of chemical structure (I) as the eta polymorph.

Application Examples

Five parts of the pigment from example 1 are dispersed in 95 parts of an aromatic-containing alkyd melamine resin varnish.

The resulting colorations have a brilliant, greenish yellow hue, high color strength, and very good hiding power. In comparison, coating materials prepared using pigments from comparative examples 1 and 2 are markedly redder and cloudier in hue. Moreover, their hiding power is low, they are difficult to disperse, and the rheological properties of the coating materials are poor. From an applications standpoint, these pigments are markedly inferior to the inventive polymorphs.

What is claimed is:

1. A process for preparing crystal polymorphs of a disazo colorant of the formula (I), which comprises causing one or more solvents selected from the group consisting of dimethylformamide, N-methylpyrrolidone, dimethyl sulfoxide, $C_4$-$C_{20}$ alcohol, 1,2-dichlorobenzene, pyridine, and nitrobenzene, or combinations of these solvents with water, the water content being from 0 to 90% by weight, to act on a compound of the formula (i) or on a tautomer, cis/trans isomer or a tautomeric cis/trans isomer of the compound of the formula (I) at a temperature of at least 100° C.

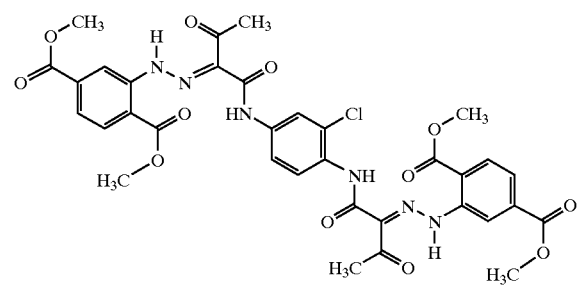

(I)

2. The process as claimed in claim 1, wherein the solvent is caused to act at a temperature of from 135 to 250° C.

3. The process as claimed in claim 1, wherein the solvent is caused to act at a temperature of from 150 to 200° C.

4. The process as claimed in claim 1, wherein the solvent is caused to act for from 1 minute to 24 hours.

5. The process as claimed in claim 1, wherein the solvent is caused to act for from 5 minutes to 10 hours.

6. The process as claimed in claim 1, wherein the solvent is caused to act for from 10 minutes to 5 hours.

7. A yellow disazo colorant of the formula (I) whose X-ray powder diagram features the following characteristic reflections (Cu—$K_\alpha$ radiation, $2\Theta$ in degrees, d in $Å^{-1}$):

| α polymorph: 2Θ | d | relative intensity |
|---|---|---|
| 6.1 | 14.6 | 100 |
| 8.2 | 10.8 | 34 |
| 9.0 | 9.9 | 13 |
| 14.1 | 6.3 | 15 |
| 15.2 | 5.8 | 6 |
| 15.8 | 5.6 | 12 |
| 17.0 | 5.2 | 6 |
| 22.1 | 4.0 | 8 |
| 23.6 | 3.8 | 8 |
| 24.0 | 3.7 | 15 |
| 24.8 | 3.6 | 8 |
| 25.3 | 3.5 | 52 |
| 26.1 | 3.4 | 29 |
| 27.3 | 3.3 | 40 |
| 28.8 | 3.1 | 17 | or

| β polymorph: 2Θ | d | relative intensity |
|---|---|---|
| 9.0 | 21.6 | 44 |
| 10.6 | 8.3 | 7 |
| 15.1 | 5.8 | 8 |
| 16.0 | 5.5 | 6 |
| 16.5 | 5.4 | 9 |
| 19.5 | 4.5 | 8 |
| 22.1 | 4.0 | 11 |
| 26.9 | 3.3 | 100 |
| 27.7 | 3.2 | 17 | or

| γ polymorph: 2Θ | d | relative intensity |
|---|---|---|
| 5.9 | 14.9 | 98 |
| 8.0 | 11.1 | 25 |
| 8.7 | 10.1 | 9 |
| 9.6 | 9.2 | 9 |
| 11.8 | 7.5 | 11 |
| 13.8 | 6.4 | 14 |
| 14.9 | 5.9 | 7 |
| 15.5 | 5.7 | 13 |
| 16.6 | 5.3 | 11 |
| 17.6 | 5.0 | 8 |
| 18.3 | 4.9 | 7 |
| 22.8 | 3.9 | 9 |
| 24.1 | 3.7 | 17 |
| 24.4 | 3.6 | 24 |
| 25.5 | 3.5 | 100 |
| 26.1 | 3.4 | 17 |
| 26.4 | 3.4 | 30 |
| 27.2 | 3.3 | 32 |
| 27.4 | 3.2 | 47 |
| 29.0 | 3.1 | 20 | or

| δ polymorph: 2Θ | d | relative intensity |
|---|---|---|
| 5.8 | 15.2 | 63 |
| 7.9 | 11.2 | 12 |
| 9.4 | 9.4 | 6 |
| 11.6 | 7.6 | 16 |
| 13.4 | 6.6 | 6 |
| 15.1 | 5.9 | 9 |
| 16.4 | 5.4 | 9 |
| 17.2 | 5.2 | 8 |
| 18.0 | 4.9 | 8 |
| 23.2 | 3.8 | 5 |
| 23.4 | 3.8 | 5 |
| 23.7 | 3.8 | 7 |
| 24.3 | 3.7 | 17 |
| 24.6 | 3.6 | 13 |
| 25.5 | 3.5 | 100 |
| 25.8 | 3.4 | 21 |
| 26.4 | 3.4 | 22 |
| 26.9 | 3.3 | 22 |
| 27.3 | 3.3 | 41 |
| 28.6 | 3.1 | 7 |
| 28.8 | 3.1 | 11 | or

| ζ polymorph: 2Θ | d | relative intensity |
|---|---|---|
| 7.0 | 12.6 | 7 |
| 8.9 | 9.9 | 23 |
| 11.2 | 7.9 | 10 |
| 11.9 | 7.4 | 48 |
| 13.2 | 6.7 | 6 |
| 14.0 | 6.3 | 7 |
| 15.1 | 5.9 | 26 |
| 17.2 | 5.1 | 37 |
| 18.0 | 4.9 | 14 |

-continued

| | | |
|---|---|---|
| 18.2 | 4.9 | 27 |
| 21.5 | 4.1 | 33 |
| 21.8 | 4.1 | 27 |
| 22.6 | 3.9 | 13 |
| 23.9 | 3.7 | 100 |
| 24.7 | 3.6 | 13 |
| 25.2 | 3.5 | 17 |
| 25.9 | 3.4 | 7 |
| 26.9 | 3.3 | 76 |
| 27.1 | 3.3 | 92 |
| 27.8 | 3.2 | 7 |
| 29.9 | 3.0 | 6 |
| 31.1 | 2.9 | 7 |
| 31.7 | 2.8 | 9 |
| 32.3 | 2.8 | 7 |
| 33.0 | 2.7 | 8 | or

| η polymorph: 2Θ | d | relative intensity |
|---|---|---|
| 9.0 | 9.9 | 60 |
| 11.5 | 7.7 | 6 |
| 14.1 | 6.3 | 6 |
| 16.0 | 5.5 | 23 |
| 20.1 | 4.4 | 7 |
| 21.5 | 4.1 | 16 |
| 26.8 | 3.3 | 100 |
| 27.5 | 3.2 | 7 |
| 27.9 | 3.2 | 12. |

8. A mixture of the disazo colorant of the formula (I) comprising at least 10% of the alpha polymorph, beta polymorph, gamma polymorph, delta polymorph, zeta polymorph, eta polymorph, defined in claim 7, or a mixture of two, three, four, five or six of these polymorphs.

9. A mixture of the disazo colorant of the formula (I) comprising at least 25% of the alpha polymorph, beta polymorph, gamma polymorph, delta polymorph, zeta polymorph, eta polymorph, defined in claim 7, or a mixture of two, three, four, five or six of these polymorphs.

10. A mixture of the disazo colorant of the formula (I) comprising at least 50% of the alpha polymorph, beta polymorph, gamma polymorph, delta polymorph, zeta polymorph, eta polymorph, defined in claim 7, or a mixture of two, three, four, five or six of these polymorphs.

11. A mixture of the disazo colorant of the formula (I) comprising at least 75% of the alpha polymorph, beta polymorph, gamma polymorph, delta polymorph, zeta polymorph, eta polymorph, defined in claim 7, or a mixture of two, three, four, five or six of these polymorphs.

12. A mixture of the disazo colorant of the formula (I) comprising at least 90% of the alpha polymorph, beta polymorph, gamma polymorph, delta polymorph, zeta polymorph, eta polymorph, defined in claim 7, or a mixture of two, three, four, five or six of these polymorphs.

13. A method for pigmenting coating materials, plastics, printing inks, electrophotographic toners and developers, powder coating materials, inks, aqueous and nonaqueous preparations, color filters, and seed comprising the step of adding a disazo colorant as claimed in claim 7 to the coating material, plastic, printing ink, electrophotographic toner and developer, powder coating material, ink, aqueous and nonaqueous preparation, color filter or seed to be pigmented.

14. A method as claimed in claim 13, comprising the step of adding a disazo colorant as claimed in claim 8 to the coating material, plastic, printing ink, electrophotographic toner and developer, powder coating material, ink, aqueous and nonaqueous preparation, color filter and seed to be pigmented.

15. A method as claimed in claim 13, comprising the step of adding a disazo colorant as claimed in claim 9 to the coating material, plastic, printing ink, electrophotographic toner and developer, powder coating material, ink, aqueous and nonaqueous preparation, color filter and seed to be pigmented.

16. A method as claimed in claim 13, comprising the step of adding a disazo colorant as claimed in claim 10 to the coating material, plastic, printing ink, electrophotographic toner and developer, powder coating material, ink, aqueous and nonaqueous preparation, color filter and seed to be pigmented.

17. A method as claimed in claim 13, comprising the step of adding a disazo colorant as claimed in claim 11 to the coating material, plastic, printing ink, electrophotographic toner and developer, powder coating material, ink, aqueous and nonaqueous preparation, color filter and seed to be pigmented.

18. A method as claimed in claim 13 comprising the step of adding a disazo colorant as claimed in claim 12 to the coating material, plastic, printing ink, electrophotographic toner and developer, powder coating material, ink, aqueous and nonaqueous preparation, color filter and seed to be pigmented.

* * * * *